(12) United States Patent
Chen

(10) Patent No.: US 8,666,150 B2
(45) Date of Patent: Mar. 4, 2014

(54) PIXEL PROCESSING METHOD AND APPARATUS THEREOF

(75) Inventor: Yung-Wei Chen, Taipei (TW)

(73) Assignees: Silicon Motion Inc., keji Chuangyeyuan, Tianan Digital, Futian, Shenzhen, Guangdong (CN); Silicon Motion Inc., Jhubei, Hsinchu County (TW)

( * ) Notice: Subject to any disclaimer, the term of this patent is extended or adjusted under 35 U.S.C. 154(b) by 885 days.

(21) Appl. No.: 12/545,080

(22) Filed: Aug. 21, 2009

(65) Prior Publication Data

US 2010/0272352 A1    Oct. 28, 2010

(30) Foreign Application Priority Data

Apr. 24, 2009  (TW) ................................ 98113689 A

(51) Int. Cl.
*G06K 9/00* (2006.01)

(52) U.S. Cl.
USPC ........ 382/162; 382/168; 382/240; 250/208.1; 250/228; 345/426

(58) Field of Classification Search
USPC ............... 382/162, 168, 240; 250/208.1, 228; 345/426
See application file for complete search history.

(56) References Cited

U.S. PATENT DOCUMENTS

| 4,742,558 A * | 5/1988 | Ishibashi et al. ............... 382/240 |
| 2002/0126892 A1* | 9/2002 | Gindele et al. ................ 382/166 |
| 2006/0188147 A1* | 8/2006 | Rai et al. ....................... 382/162 |

FOREIGN PATENT DOCUMENTS

TW              569606           1/2004

* cited by examiner

*Primary Examiner* — Chan S Park
*Assistant Examiner* — Eueng-Nan Yeh
(74) *Attorney, Agent, or Firm* — Winston Hsu; Scott Margo

(57) ABSTRACT

A pixel processing method includes: selecting a first plurality of color component values of a first plurality of pixels within a pixel block in a buffering device, performing a first color component process upon a first target pixel in the first plurality of pixels to determine a first target color component value of the first target pixel; and selecting a second plurality of color component values of a second plurality of pixels within the pixel block at the same time as the first color component process is performed, and performing a second color component process upon a second target pixel in the second plurality of pixels according to the second plurality of color component values to determine at least one underdetermined target color component value of the second target pixel, wherein the second target pixel has been processed by the first color component process.

18 Claims, 10 Drawing Sheets

| $R_{11}$ | $G_{12}$ | $R_{13}$ | $G_{14}$ | $R_{15}$ |
|---|---|---|---|---|
| $G_{21}$ | $B_{22}$ | $G_{23}$ | $B_{24}$ | $G_{25}$ |
| $R_{31}$ | $G_{32}$ | $R_{33}$ | $G_{34}$ | $R_{35}$ |
| $G_{41}$ | $B_{42}$ | $G_{43}$ | $B_{44}$ | $G_{45}$ |
| $R_{51}$ | $G_{52}$ | $R_{53}$ | $G_{54}$ | $R_{55}$ |

|  | P16 | P26 | P36 | P46 | P56 |
|---|---|---|---|---|---|
|  | P15 | P25 | P35 | P45 | P55 |
|  | P14 | P24 | P34 | P44 | P54 |
|  | P13 | P23 | P33 | P43 | P53 |
|  | P12 | P22 | P32 | P42 | P52 |
|  | P11 | P21 | P31 | P41 | P51 |

900

900a

PIXEL PROCESSING METHOD AND APPARATUS THEREOF

BACKGROUND OF THE INVENTION

1. Field of the Invention

The present invention relates to a pixel processing method and a related apparatus, and more particularly, to a pixel processing method and a related apparatus which performs a green color component value adjustment upon a first pixel within a pixel block while simultaneously computing all color component values of a second pixel within the pixel block.

2. Description of the Prior Art

In a conventional image processing system, when an image sensor detects an exterior image, the image sensor generates color component values of each pixel and transmits the color component values to line buffers of an image signal processor (ISP). The color component values will be temporarily stored into the line buffers, wherein each pixel only has one color component value corresponding to one color, which is illustrated in FIG. 1. As shown in FIG. 1, a color filter array 10 is generated by the fact that the image sensor of the conventional image processing system detects the exterior image. Each row of the color filter array 10 is composed of different color component values of each pixel. As can be seen from FIG. 1, the first row of color filter array 10 is alternately arranged by red and green (R and G) color components to store the color components values of each pixel, and the second row is alternately arranged by green and blue (G and B) color components to store the color component values of each pixel, and so on. However, each pixel must finally have information of three color component values (R, G and B color components) so that the detected image can be precisely displayed on a display device. Thus, pixels with a single color component value in the color filter array 10 should be further processed and computed in order to make each pixel have three R, G, and B color component values, and then the pixels with three color component values are transmitted to a display driver. Accordingly, the display driver drives the display device according to the R, G and B color component values of each pixel to display the detected exterior image.

There are two steps that need to be performed upon the color filter array 10 to obtain all three R, G, and B color component values of each pixel. The first step is green color value adjustment, and the second step is interpolation. There are two kinds of green color value adjustments, one of which is Gr balance adjustment and the other of which is Gb balance adjustment. The so-called Gr balance adjustment adjusts the green color values of the green color components within the rows of the color filter array 10 where the red color components are located, such as the green color values $G_{12}, G_{14}, G_{32}$ and $G_{34}$ shown in FIG. 1. The so-called Gb balance adjustment is to adjust the green color values of the green color components within the rows of the color filter array 10 where the blue color components are located, such as the green color values $G_{21}, G_{23}, G_{25}, G_{41}, G_{43}$, and $G_{45}$ shown in FIG. 1. Generally, only one of the Gr balance adjustment and Gb balance adjustment will be performed upon the color filter array 10. In other words, the Gr balance adjustment and the Gb balance adjustment cannot be performed upon the color filter array at the same time. Once the green color value adjustment is performed upon the color filter array 10, all green color values within the color filter array 10 can be deemed as adjusted. Then, an interpolation operation will be performed upon the adjusted color filter array 10 to generate three R, G, and B color component values of each pixel. To take the color filter array 10 shown in FIG. 1 as an example, the green color value adjustment and the interpolation are separately performed. During the green color value adjustment of the color filter array 10 (e.g. adjustment performed upon the green color value $G_{23}$), two line buffers are required. In addition, a further four line buffers are required for performing an interpolation operation upon the adjusted color filter array 10 (e.g. for the red color value $R_{33}$). As a result, the conventional method in total needs six line buffers to compute the R, G and B color component values of each pixel within the color filter array 10. Hence, how to reduce the number of line buffers used by the ISP in order to decrease hardware costs has become a problem that manufacturers need to solve.

SUMMARY OF THE INVENTION

With this in mind, it is therefore one objective of the present invention to provide a method and a related apparatus which perform a green color value adjustment upon a first pixel within a pixel block while simultaneously computing all color component values of a second pixel with in the same pixel block.

According to one exemplary embodiment of the present invention, a pixel processing method is provided. The pixel processing method comprises: selecting a first plurality of color component values of a first plurality of pixels within a pixel block of a buffering device, and performing a first color component process upon a first target pixel in the first plurality of pixels to determine a first target color component value of the first target pixel, and storing the first target color component value; and while the first color component process is being performed, simultaneously selecting a second plurality of color component values of a second plurality of pixels within the pixel block and performing a second color component process upon a second target pixel in the second plurality of pixels according to the second plurality of color component values to determine at least one underdetermined target color component value of the second target pixel, wherein the second target pixel has been processed by the first color component process.

According to another exemplary embodiment of the present invention, a pixel processing apparatus is provided. The pixel processing apparatus comprises: a buffering device, a first processing device, and a second processing device. The buffering device is utilized for temporarily storing a first plurality of color component values of a first plurality of pixels within a pixel block and a second plurality of color component values of a second plurality of pixels within the pixel block. The first processing device is utilized for selecting the first plurality of color component values of the first plurality of pixels within the pixel block and performing a first color component process upon a first target pixel in the first plurality of pixels to determine a first target color component value of the first target pixel. While the first color component process is being performed, the second processing device is utilized for simultaneously selecting the second plurality of color component values of the second plurality of pixels within the pixel block and performing a second color component process upon a second target pixel in the second plurality of pixels according to the second plurality of color component values to determine at least one underdetermined target color component value of the second target pixel, wherein the second target pixel has been processed by the first color component process.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIG. 1 is a diagram showing a color filter array generated by an image sensor of a conventional image processing system detecting an exterior image.

FIG. 9 is a diagram showing a color filter array having a size of 5×6 pixels.

DETAILED DESCRIPTION

Figure 2:
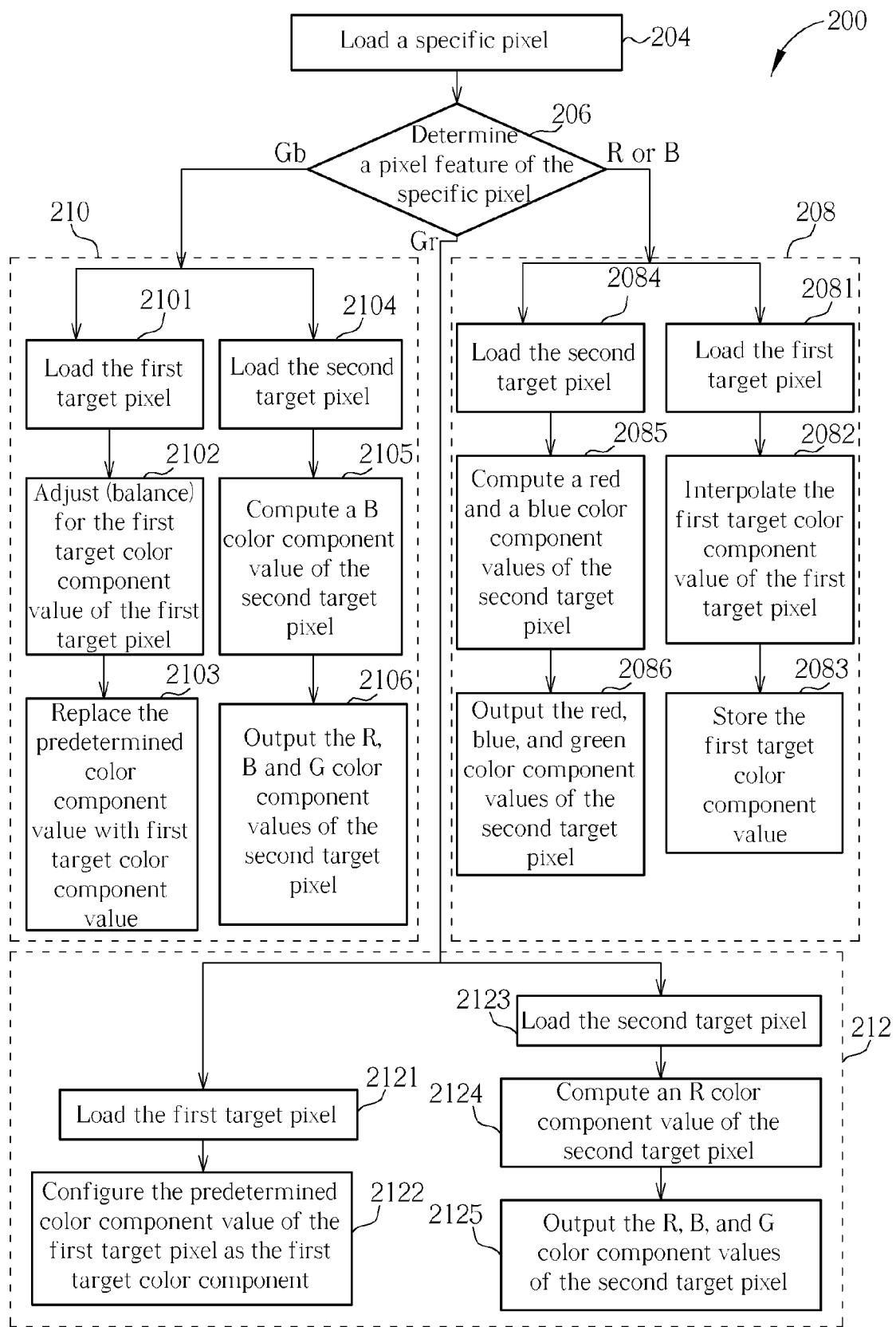
FIG. 2 is a flow chart of a pixel processing method of processing a plurality of pixels corresponding to a color filter array according to one exemplary embodiment of the present invention.

Certain terms are used throughout the following descriptions and claims to refer to particular system components. As one skilled in the art will appreciate, manufacturers may refer to a component by different names. This document does not intend to distinguish between components that differ in name but not differ in functionality. In the following discussion and in the claims, the terms "include", "including", "comprise", and "comprising" are used in an open-ended fashion, and thus should be interpreted to mean "including, but not limited to . . . " The terms "couple" and "coupled" are intended to mean either an indirect or a direct electrical connection. Thus, if a first device couples to a second device, that connection may be through a direct electrical connection, or through an indirect electrical connection via other devices and connections Please refer to FIG. 2, which depicts a flow chart of a pixel processing method 200 corresponding to a color filter array 100 according to one exemplary embodiment of the present invention. The color filter array 100 is located within a pixel block 104 (represented by thicker lines) of a buffering device 102 which is comprised of approximately four line buffers of an image signal processor (ISP) as shown in FIG. 3. The diagram of the buffering device 102 in the ISP is illustrated in FIG. 3. The pixel block 104 comprises the color filter array 100 having a size of 5×6 pixels. For expressing the spirit of the present invention more clearly, the color component corresponding to each pixel is labeled with the letter representative of its color and relative coordinate. For example, as can be seen from the figure, G11 represents a green color component located at the coordinate (1, 1) and B12 represents a blue color component located at the coordinate (1, 2). In addition, the pixel block 104 moves along the X-axis direction to continually load out the un-processed pixel color component values in the buffering device 102 to perform the pixel processing method 200. Those skilled in the art should appreciate that when the pixel block 104 reaches the right rim of the buffering device 102, the pixel block 104 turns to move along the Y-axis direction for a next pixel and then starts to move along the left rim of the buffering device 102 in the X-axis direction to perform the pixel processing method 200. Please note that, even though the above illustration of the pixel processing method 200 utilizes a pixel block whose size is 5×6 pixels for computation, this is not meant to be a limitation of the scope of the present invention. In other words, those skilled in the art will readily observe that numerous modifications and alterations of the present invention may be made while retaining the teachings in the descriptions. For example, a pixel block whose size is 6×8 pixels is also a feasible implementation without departing from the scope of the present invention.

Furthermore, the present invention also provides a pixel processing apparatus to perform the said pixel processing method 200. Please refer to FIG. 4, which illustrates an exemplary diagram of a pixel processing apparatus 400 of the present invention. The pixel processing apparatus 400 comprises a buffering device 102, a first processing device 404, a second processing device 406 and a third processing device 408. As mentioned above, the buffering device 102 is utilized for temporarily storing the plurality of color component values respectively corresponding to the plurality of pixels within the pixel block 104, and the pixel block 104 moves along the X-axis and Y-axis within a video frame 401. The first processing device 404 is coupled to the buffering device 102 and is utilized for selecting a first plurality of color component values of a first plurality of pixels within the pixel block 104, and utilized for performing a first color component process upon a first target pixel in the first plurality of pixels to determine a first target color component value of the first target pixel.

In this embodiment, the first processing device includes a first computation unit 4042, a second computation unit 4044 and a third computation unit 4046. The second processing device 406 is coupled to the buffering device 102, and, while the first processing device 404 is executing the first color component process, the second processing device 406 is utilized for simultaneously selecting a second plurality of color component values of a second plurality of pixels within the pixel block 104, and, in accordance with the second plurality of color component values, is utilized for performing a second color component process upon a second target pixel in the second plurality of pixels to determine at least one underdetermined target color component value of the second target pixel, wherein the second target pixel has already been processed by the first color component process. In this embodiment, the second processing device 406 comprises a fourth computation unit 4062, a fifth computation unit 4064 and a sixth computation unit 4066. The third processing device 408 is coupled to the buffering device 102 and is utilized for loading a specific pixel within the pixel block 104, and in accordance with a pixel feature of the specific pixel, enables one of the first computation unit 4042, the second computation unit 4044 and the third computation unit 4046 inside the first processing device 404. The first computation unit 4042 is utilized for interpolating (generating) the first target color component value of the first target pixel. The second computation unit 4044 is utilized for balancing the first target color component value of the first target pixel. The third computation unit 4046 is utilized for configuring a predetermined color component value of the first target pixel as the first target color component value. The fourth computation unit 4062 is utilized for computing a red color component value and a blue color component value of the second target pixel which are used as the underdetermined target color component values when a predetermined color component value of the second target pixel corresponds to a green color component. The fifth computation unit 4064 is utilized for computing a blue color component value of the second target pixel which is used as the underdetermined target color component value when the predetermined color component value of the second target pixel corresponds to a red color component. The sixth computation unit 4066 is utilized for computing a red color component value of the second target pixel which is used as the underdetermined target color component value when the predetermined color component value of the second target pixel corresponds to a blue color component. It should be carefully noted that the foregoing first processing device 404, the second processing device 406, the third processing device 408, the first computation unit 4042, the second computation unit 4044, the third computation unit 4046, the fourth computation unit 4062, the fifth computation unit 4064 and the sixth computation unit are for illustrative purposes only, and are not meant to be limitations of the scope of the present invention. In other words, if the above-mentioned processing devices and the computation units have the same or similar functions, it is also feasible to implement the same or similar processing devices and computation units with a single processing device or computation unit. For example, in implementation, the third computation unit 4046, the fourth computation unit 4062 and the fifth computation unit 4064 can be incorporated into a single computation unit. Moreover, the processing device and computation unit can be alternatively implemented with hardware, software or firmware, which also falls within the scope of the present invention.

According to one exemplary embodiment of the present invention, the pixel processing method 200 selects the first plurality of color component values of the first plurality of pixels within the pixel block 104 of the buffering device 102, and performs the first color component process upon the first target pixel in the first plurality of pixels to determine the first target color component value of the first target pixel, and stores the first target color component value. Then, while the first color component process is being performed, the pixel processing method 200 simultaneously selects the second plurality of color component values of the second plurality of pixels within the pixel block 104, and performs the second color component process upon the second target pixel in the second plurality of pixels according to the second plurality of color component values to determine at least one underdetermined target color component value of the second target pixel, wherein the second target pixel has been processed by the first color component process.

Furthermore, to prevent from distortions of the green color component due to repeatedly adjusting the green color components within the pixel block 104, the pixel processing method 200 of the present invention determines the green color value adjustment from one of the Gr balance adjustment and the Gb balance adjustment. Please note that, in the following, the Gb balance adjustment will be explained as the green color value adjustment for illustrative purposes only. The implementation of the Gr balance adjustment is also feasible without departing from the scope of the present invention.

Thus, the pixel processing method 200 comprises the following steps:

Step 204: Load a specific pixel within the pixel block 104 of the buffering device 102;

Step 206: Determine a pixel feature of the specific pixel (e.g. a color component feature); if the specific pixel corresponds to a red (R) color component or a blue (B) color component, the flow goes to Step 208; if the specific pixel corresponds to a green (G) color component and an adjacent pixel adjacent to the specific pixel in the same row corresponds to a B color component, the flow goes to Step 210; and if the specific pixel corresponds to a G color component and an adjacent pixel adjacent to the specific pixel in the same row corresponds to an R color component, the flow goes to Step 212;

Step 208: Interpolate the first target color component value of the first target pixel according to a first portion of color component values of the first plurality of color component values and perform the second color component process upon the second target pixel in the second plurality of pixels according to the second plurality of color component values to determine at least the underdetermined target color component value of the second target pixel;

Step 210: Balance the first target color component value of the first target pixel at least according to a second portion of color component values of the first plurality of color component values and perform the second color component process upon the second target pixel in the second plurality of pixels according to the second plurality of color component values to determine at least the underdetermined target color component value of the second target pixel;

Step 212: Configure a predetermined color component value of the first target pixel as at least the first target color component value and perform the second color component process upon the second target pixel in the second plurality of pixels according to the second plurality of color component values to determine at least the underdetermined target color component value of the second target pixel.

Figure 3:
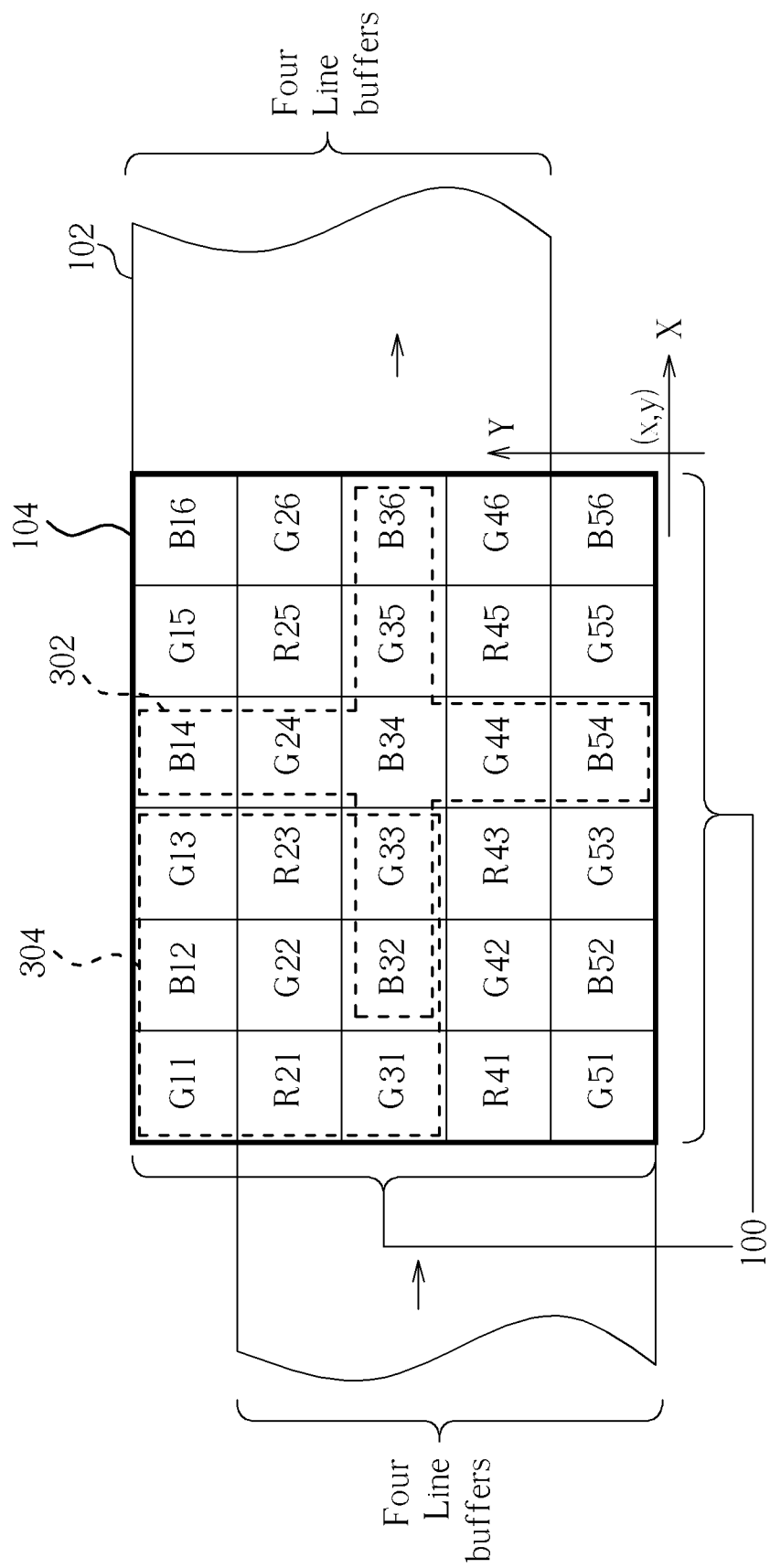
FIG. 3 is a diagram showing a buffering device inside an image signal processor.
Figure 4:
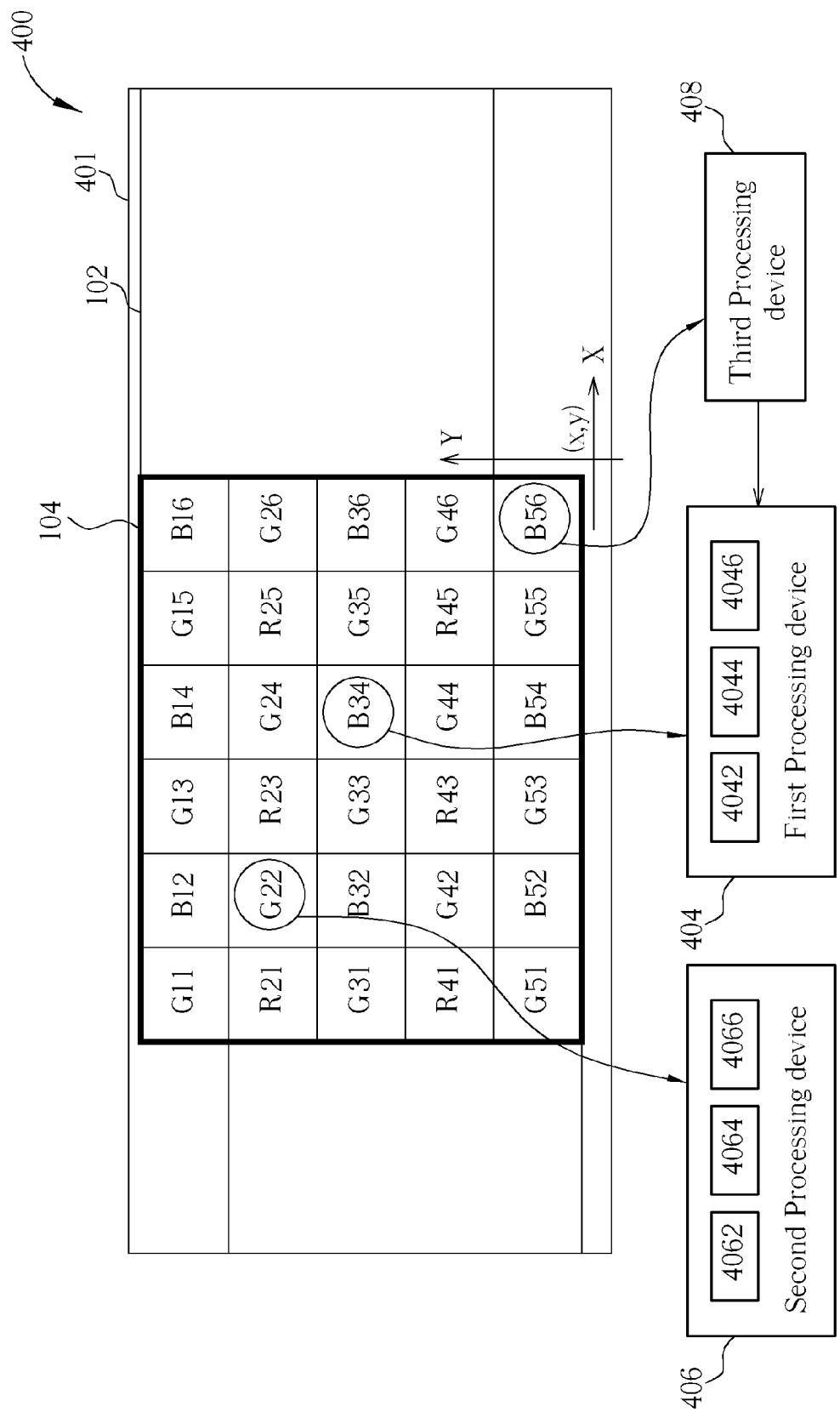
FIG. 4 is a diagram of a pixel processing device according to one exemplary embodiment of the present invention.

Please refer to FIG. 2, FIG. 3, and FIG. 4 simultaneously. In Step 204, the third processing device 408 loads out the specific pixel in the pixel block 104 of the buffering device 102 to determine the color component feature of the specific pixel. In this embodiment, the specific pixel is located at the bottom-right corner of the 104, which is the pixel with the coordinates (x, y), wherein the corresponding color component of the specific pixel is B, and the predetermined color component value is B56 as shown in FIG. 3. In Step 206, when the third processing device 408 determines that the color component of the specific pixel corresponds to a red (R) or a blue (B) color component, the third processing device 408 enables the first computation unit 4042 inside the first processing device 404 to perform the first color component process by interpolating the first target color component value G34' of the first target pixel according to the first portion of the color component values of the first plurality of color component values. In this embodiment, the first target pixel is located at the coordinate (x−2, y+2) within the pixel block 104, wherein the predetermined color component of the first target pixel is B and the corresponding predetermined color component value is B34. Additionally, the first plurality of pixels are pixels surrounded by the dashed line 302. Thus, the first plurality of color component values are respectively B14, G24, B34, G44, B54, B32, G33, G35 and B36.

In this embodiment, the second target pixel is located at the (x−4, y+3) within pixel block 104, wherein the predetermined color component of the second target pixel is green and the predetermined color component value is G22. Since a predetermined color component value of the second target pixel is a green color component, at the same time when the first computation unit 4042 interpolates the first target color component value G34', the fourth computation unit 4062 inside the second processing device 406 can perform the second color component process to compute a red and a blue color component value of the second target pixel to be the underdetermined target color component values. In this embodiment, the second plurality of pixels is those pixels surrounded by the dashed line 304, so the second plurality of color component values are G11, B12, G13, R21, G22, R23, G31, B32 and G33. Thus, Step 208 included in the pixel processing method 200 of the present invention further comprises:

Step 2081: Load the first target pixel;

Step 2082: Utilize a first portion of the first plurality of color component values surrounded by the dashed line 302 to interpolate the first target color component value G34' of the first target pixel, wherein the first target color component value G34' is the green color component in this embodiment;

Step 2083: Store the first target color component value G34';

Step 2084: Load the second target pixel;

Step 2085: Utilize the second plurality of color component values surrounded by the dashed line 304 to compute a red and a blue color component values of the second target pixel, which are respectively R22' and B22';

Step 2086: Output the red, blue, and green color component values of the second target pixel which are respectively R22', B22' and G22'.

Please note that, since the pixel block 104 moves along the X-axis direction, the green color component value G22' of the second target pixel is generated by the foregoing Step 212, and detailed descriptions about how Step 212 generates the green color component value will be explained in the following. In Step 2081 and Step 2084, the first computation unit 4042 and the forth computation unit 4062 respectively load out the first target pixel and the second target pixel within the pixel block 104. Then, in Step 2082, the first computation unit 4042 utilizes a first portion of the first plurality of color component values surrounded by the dashed line 302 to interpolate the first target color component value G34' of the first target pixel (which is located at the coordinate (x−2, y+2)), and the first target color component value G34' will be stored in a register. At the same time, in Step 2085, the fourth computation unit 4062 utilizes the second plurality of color component values surrounded by the dashed line 304 to compute red and blue color component values of the second target pixel (which is located at the coordinate (x−4, y+3)), which are respectively R22' and B22'. Accordingly, in Step 2086, the fourth computation unit 4062 outputs the red, blue, and green color component values of the second target pixel which are respectively R22', B22' and G22', wherein G22' is generated in Step 212.

Figure 5:
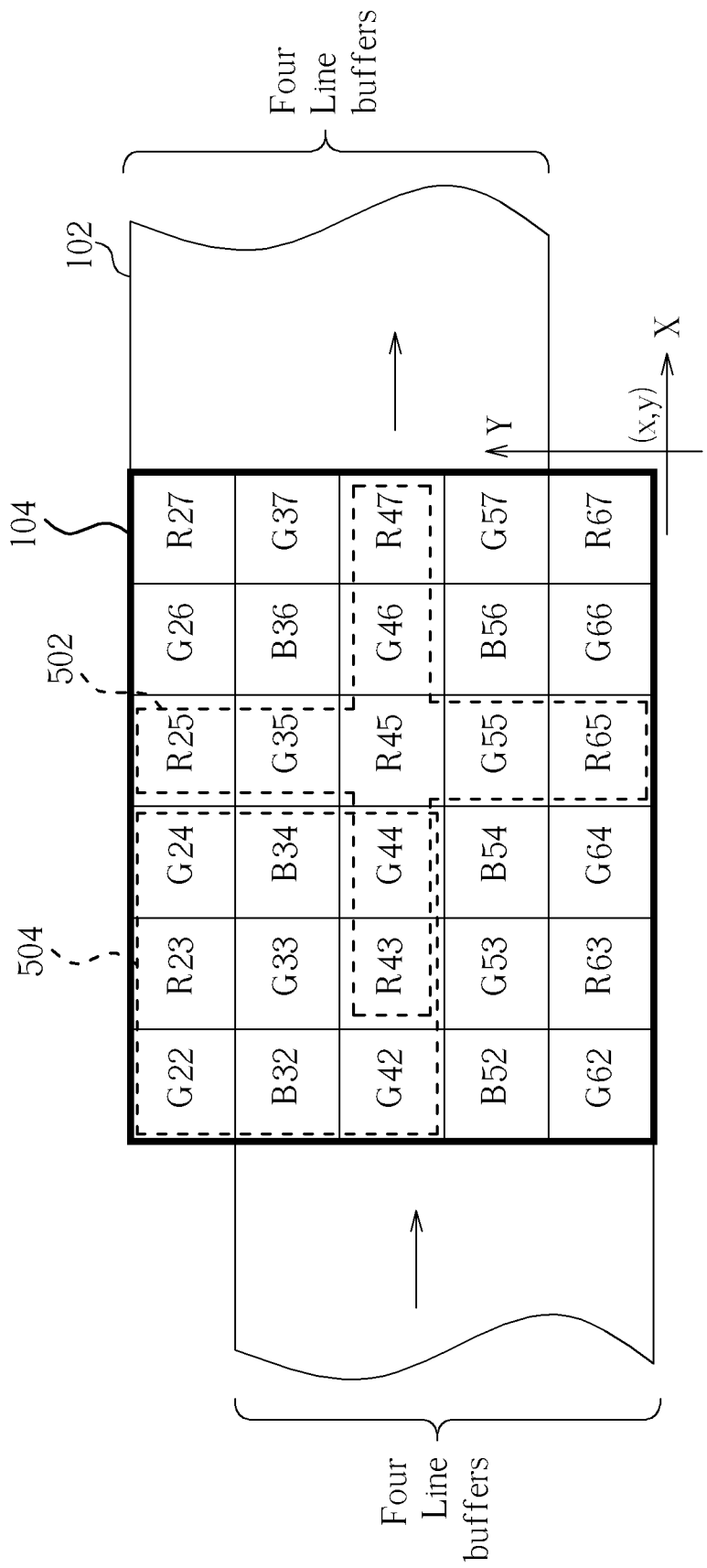
FIG. 5 is a diagram showing the condition that a color component of a specific pixel within a pixel block corresponds to red.

Please refer to FIG. 5, which depicts a diagram showing the condition where the color component of the specific pixel within the pixel block 104 is red. When the specific pixel locating at the coordinate (x, y) corresponds to the red color component, the first computation unit 4042 utilizes a first potion of color component values of the first plurality of color component values surrounded by the dashed line 502 to interpolate the first target color component value G45' of the first target pixel (which is located at the coordinate (x−2, y+2)), and stores the first target color component value G45' into a register. At the same time, the fourth computation unit 4062 utilizes a second plurality of color component values surrounded by the dashed line 504 to compute the red and the blue color component of the second target pixel (which is located at the coordinate (x−4, y+3)), which are R33' and B33'. Accordingly, the fourth computation unit 4062 outputs the red, blue and green color component values of the second target pixel, which are respectively R33', B33' and G33'. Since the foregoing descriptions are similar to Steps 2081-2086, detailed descriptions are omitted here.

Figure 6:
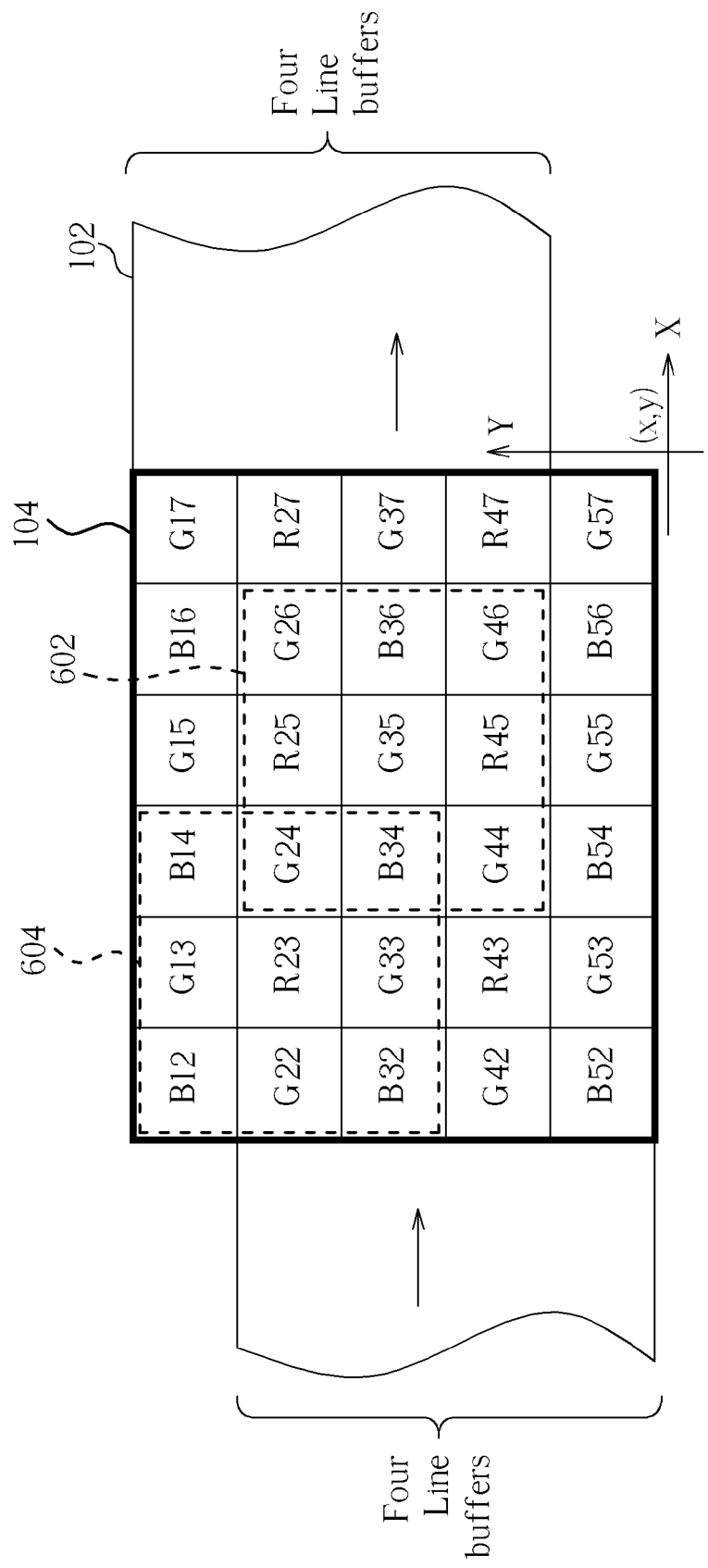
FIG. 6 is a diagram showing the condition that a color component of the specific pixel within the pixel block corresponds to green.

When the pixel block 104 of the buffering device 102 shifts from the location of the coordinate shown in FIG. 3 by one pixel to the right, the pixel block 104 will include the plurality of color component values as shown in FIG. 6. FIG. 6 is a diagram showing the condition that the color component of the specific pixel within the pixel block is G. As can be seen by FIG. 6, since an adjacent pixel (which is located at the coordinate (x−1, y)) adjacent to the specific pixel in the same row corresponds to a B color component, it can therefore be known that another adjacent pixel adjacent to the first target pixel (which is located at the coordinate (x−2, y+2)) also corresponds to a B color component. That is, the G color component value of the first target pixel must be processed by the Gb balance adjustment in order to compute the adjusted G color component value G35' of the first target pixel. Please note that, in FIG. 6, the predetermined color component of the first target pixel is G, the predetermined color component value is G35 and the first plurality of pixels are those surrounded by the dashed line 602. Thus, the first plurality of color component values are G24, R25, G26, B34, G35, B36, G44, R45 and G46.

In this embodiment, the second target pixel is located at the coordinate (x−4, y+3) within the pixel block 104, wherein the predetermined color component of the second target pixel is an R color component, and the predetermined color component value is R23. Since a predetermined color component value of the second target pixel is an R color component value, while computing the adjusted G color component value G35' of the first target pixel, the fourth computation unit 4062 inside the second processing device 406 performs the second color component process to compute a B color component value of the second target pixel as the underdetermined target color component value. In this embodiment, the second plurality of pixels is those pixels surrounded by the dashed line 604, so the second plurality of color component values are B12, G13, B14, G22, R23, G24, B32, G33 and B34. Thus, Step 210 in the pixel processing method 200 of the present invention comprises the following steps:

Step 2101: Load the first target pixel;

Step 2102: Utilize a first portion of color component values of the first plurality of color component values surrounded by the dashed line 602 to adjust (balance) for the first target color component value G35' of the first target pixel;

Step 2103: Replace the predetermined color component value with first target color component value G35' as G35;

Step 2104: Load the second target pixel;

Step 2105: Utilize the second plurality of color component values surrounded by the dashed line 304 to compute a B color component value of the second target pixel, which is B23';

Step 2106: Output the R, B and G color component values of the second target pixel, which are respectively R23', B23' and G23', wherein the predetermined color component value of R23' is R23, and G23' is the G color component value generated in Step 208 by interpolation.

Please note that, since the pixel block 104 moves along the X-axis, the green color component value G23' of the second target pixel is generated according to the foregoing Step 208. Similarly, in the steps 2101 and 2104, the first computation unit 4042 and the fourth computation unit 4062 respectively load the first target pixel and the second target pixel in the pixel block 104. Accordingly, in Step 2102, the first computation unit 4042 employs a first portion of the first plurality of color component values included in the dashed line 602 to adjust the first target color component value of the first target pixel (that is, the pixel located at (x−2, y+2)) so that the adjusted first target color component value G35' can be generated, and the adjusted first target color component value G35' is further utilized for replacing the predetermined color component value G35. Simultaneously, in Step 2105, the fourth computation unit 4062 utilizes the second plurality of color component values included in dashed line 604 to determine the B color component value of the second target pixel (which is located at the coordinate (x−4, y+3)), which is B23'. In Step 2106, the fourth computation unit 4062 outputs the color component values of R, G and B of the second target pixel, which are respectively R23', B23', and G23', wherein the predetermined color component value of R23' is R23 and G23' is the green color component value derived by interpolation in the foregoing Step 208.

Figure 7:
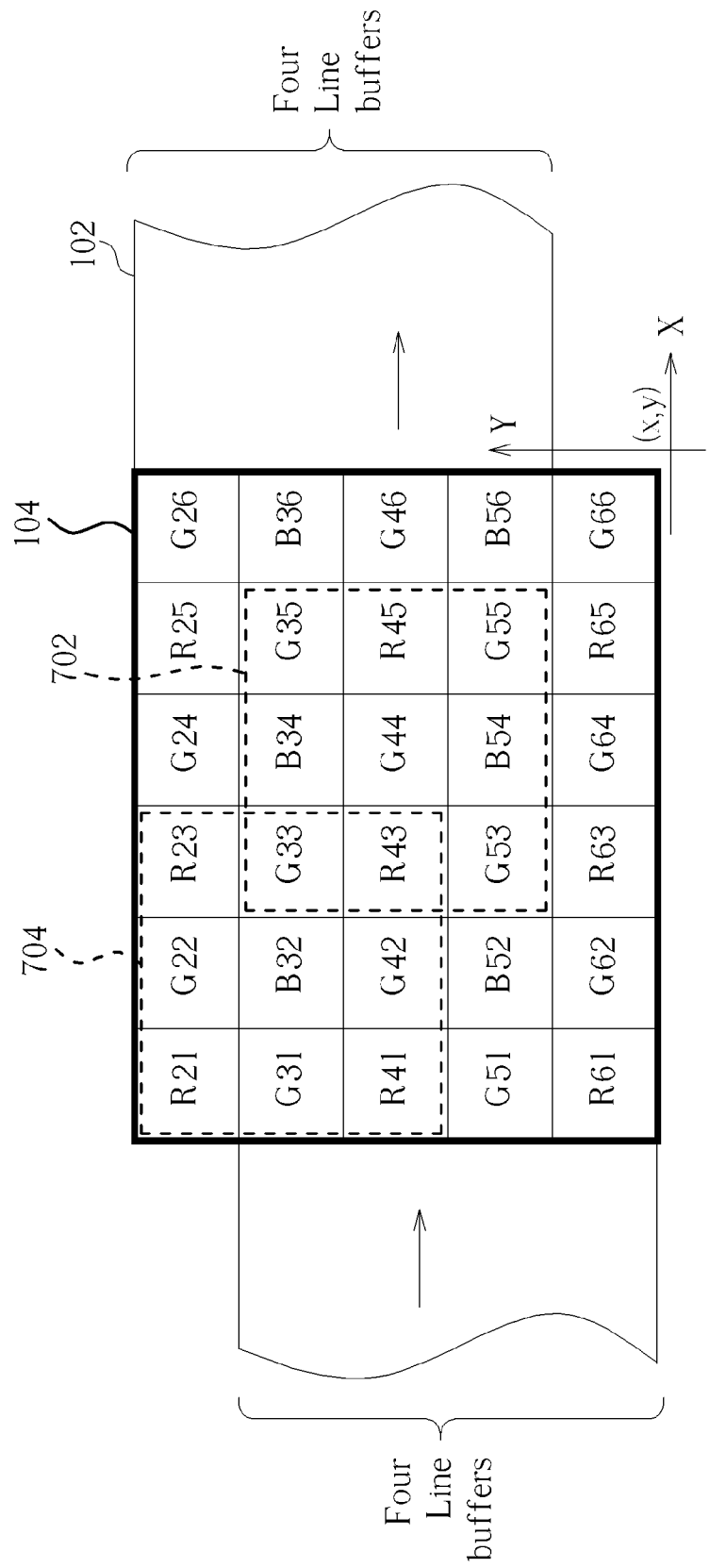
FIG. 7 is a diagram showing the condition that an adjacent pixel in a same row where the specific pixel is located corresponds to a red color component.

Please refer to FIG. 7, which depicts a diagram showing an adjacent pixel (which is located at the coordinate (x−1, y)) adjacent to the specific pixel in the same row corresponds to an R color component. As illustrated in FIG. 7, the adjacent pixel (at the coordinate (x−2, y+2)) adjacent to the first target pixel in the same row corresponds to an R color component. In other words, it is unnecessary to perform the Gr balance adjustment upon the G color component value of the first target pixel. Moreover, in FIG. 7, the predetermined color component of the first target pixel is G, the corresponding color component value is G44, and the first plurality of pixels is those pixels surrounded by dashed line 702. Thus, the first plurality of color component values are respectively G33, B34, G35, R43, G44, R45, G53, B54 and G55. At the same time, since a predetermined color component of the second target pixel is a B color component, the fourth computation unit 4062 in the second processing device 406 performs the second color component process to figure out an R color component value of the second target pixel as the underdetermined target color component value. In this embodiment, the second target pixel is located at the coordinate of (x−4, y+3) of the pixel block 104, wherein the predetermined color component of the second target pixel is B, the predetermined color component value is B32 and the second plurality of pixels are the pixels surrounded by the dashed line 704. Thus, the second plurality of color component values are R21, G22, R23, G31, B32, G33, R41, G42 and R43. Therefore, the step 212 in the pixel processing method 200 comprises the following steps of:

Step 2121: Load the first target pixel;

Step 2122: Configure the predetermined color component value G44 of the first target pixel as the first target color component value G44';

Step 2123: Load the second target pixel;

Step 2124: Utilize the second plurality of color component values surrounded by the dashed line 704 to determine an R color component value R32' of the second target pixel;

Step 2125: Output the R, B, and G color component values of the second target pixel, which are respectively R32', B32' and G32', wherein the predetermined color component value of B32' is B32 and G32' is the adjusted G color component value which is adjusted by the step 210.

By the same token, since the pixel block 104 moves along the X-axis, the G color component value G32' of the second target pixel is also generated by Step 210. Similarly, in Steps 2121 and 2123, the first computation unit 4042 and the fourth computation unit 4062 respectively load the first target pixel and the second target pixel in the pixel block 104. Accordingly, in Step 2122, the first computation unit 4042 configures the predetermined color component value G44 of the first target pixel as the first target color component value G44'. At the same time, in Step 2124, the fourth computation unit 4062 utilizes the second plurality of color component values surrounded by the dashed line 704 to compute the red color component value of the second target pixel (which is located at the coordinate of (x−4, y+3)), which is R32'. Then, in Step 2128, the fourth computation unit 4062 outputs the R, B and G color component values of the second target pixel, which are respectively R32', B32' and G32', wherein the predetermined value of the color component value B22' is B32, and G32' is an adjusted green color component value obtained in Step 210.

Figure 8:
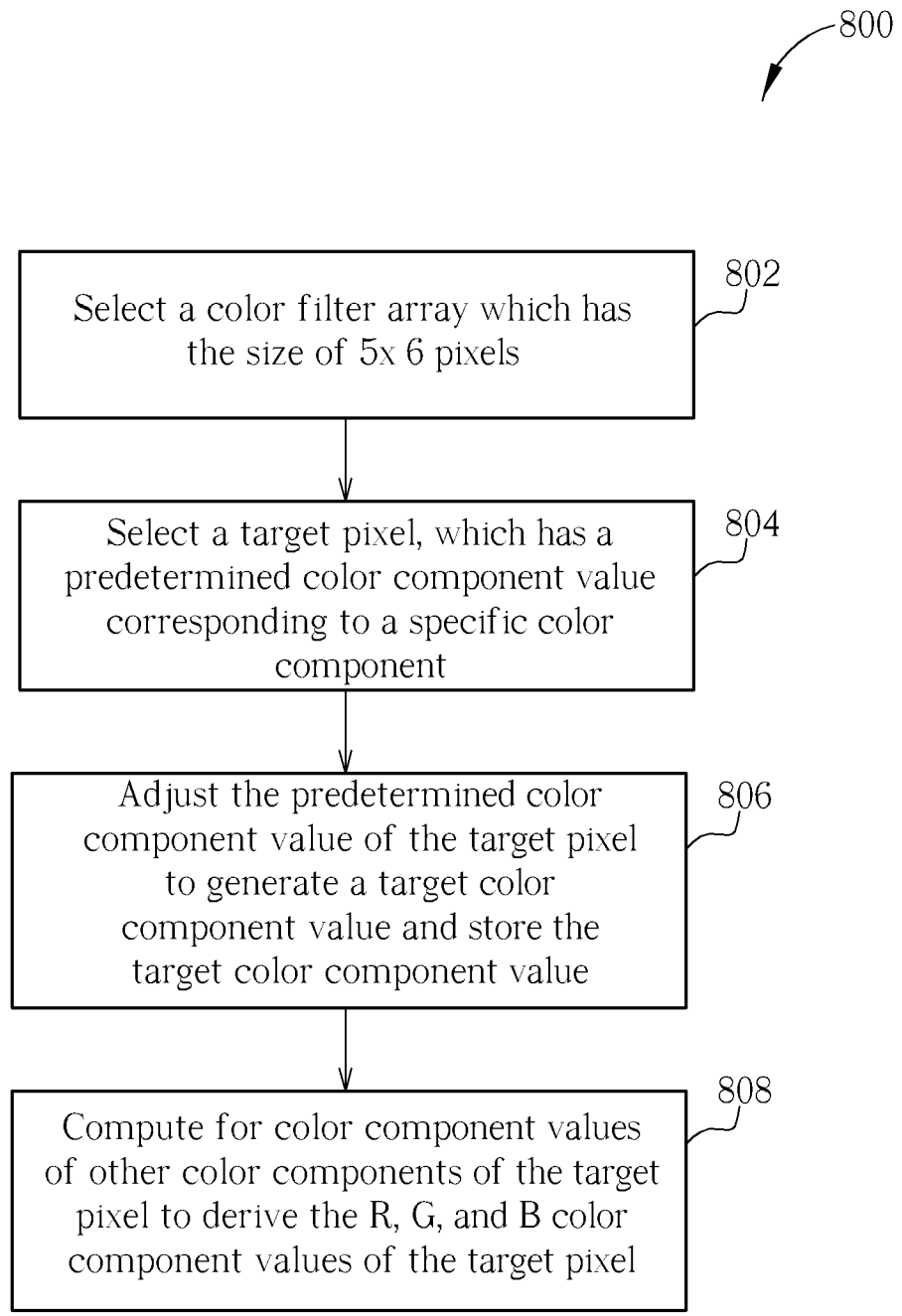
FIG. 8 is a flow chart of a pixel processing method to generate a target color component value of a target pixel according to one exemplary embodiment of the present invention.

Please refer to FIG. 8, which depicts a flow chart of a pixel process method 800 of balancing for a target color component value of a target pixel according to one exemplary embodiment of the present invention. Please note that the pixel processing method 800 can be applied in Step 210 of the pixel processing method 200. In other words, the pixel processing method 800 can also be performed by the second computation unit 4044 to balance for the target color component value of the target pixel. Hence, to express the spirit of the present invention more clearly, the pixel processing method 800 is illustrated in FIG. 9 in conjunction with the pixel block 104 of FIG. 6. However, this is not meant to be a limitation. FIG. 9 depicts a diagram of the color filter array 900 having the size of 5×6 pixels according to one exemplary embodiment of the present invention. In the color filter array 900, the pixels in the first row are P11-P16, whose pixel component values are respectively B11, G12, B13, G14, B15, and G16; the pixels in the second row are P21-P26, whose pixel component values are respectively G21, R22, G23, R24, G25, and R26; the pixels in the third row are P31-P36, whose pixel component values are respectively B31, G32, B33, G34, B35 and G36; the pixels in the fourth row are P41-P46, whose pixel component values are respectively G41, R42, G43, R44, G45 and R46; and the pixels in the fifth row are P51-P56, whose pixel component values are respectively B51, G52, B53, G54, B55 and G56. In addition, the uppercase letters "G", "R" and "B" respectively represent G, R, and B color components.

Provided the result is substantially the same, the steps set forth here are not limited to be executed according to the exact order shown in FIG. 9. Also, the steps need not be in the exact order shown in FIG. 9 and need not be contiguous; that is, other steps can be intermediate. The pixel processing method comprises:

Step 802: Select a color filter array 900 which has the size of 5×6 pixels;

Step 804: Select a target pixel P34, which has a predetermined color component value G34 corresponding to the specific color component;

Step 806: Adjust the predetermined color component value G34 of the target pixel P34 to generate a target color component value G34' and store the target color component value G34';

Step 808: Compute for color component values of other color components of the target pixel P34 to derive the R, G, and B color component values of the target pixel P34.

Since the uppercase letters "G", "R" and "B" respectively represent green, red and blue color components, the lowercase letters "g", "r" and "b" are utilized for representing green, red and blue color component values in this embodiment. In Step 802, when the color filter array 900 having the size of 5×6 pixels is selected, the pixel processing method 800 of the present invention performs a green color value adjustment upon the color filter array 900, wherein the green color value adjustment could be a Gr balance adjustment or a Gb balance adjustment. As the pixel processing method 200 described above, the Gb balance adjustment is utilized as an implementation of the green color value adjustment for illustrative purposes only. Those skilled in the art should appreciate that the Gb balance adjustment is not a limitation of the present invention and, in another embodiment of the present invention, the green color value adjustment could be the Gr balance adjustment.

Figure 10:
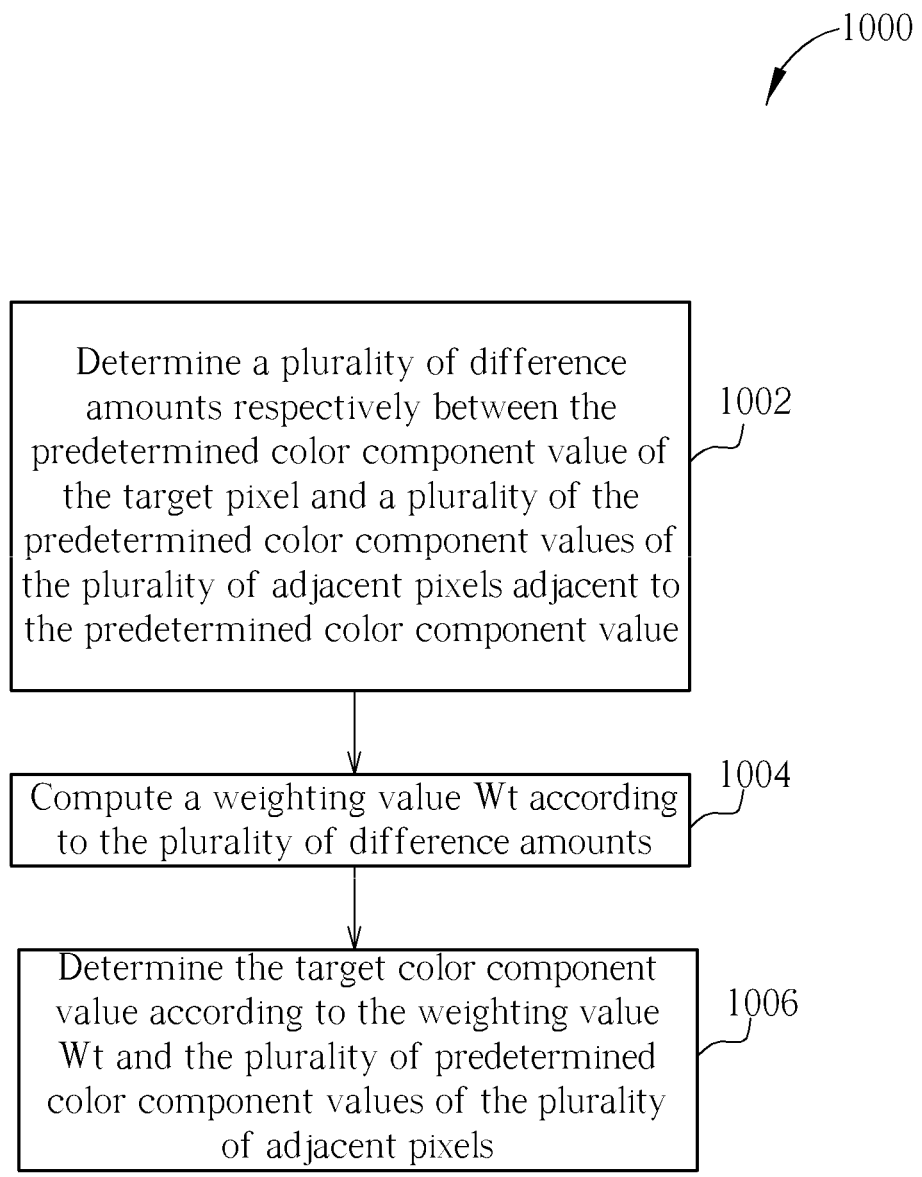
FIG. 10 is a flow chart of a green colorvalue adjustment according to one exemplary embodiment of the present invention.

Please refer to FIG. 9 again. A pixel region 900a of the color filter array 900 is employed in the green color value adjustment. First, the target pixel P34 in the pixel region 900a is selected, wherein the target pixel P34 has the predetermined color component value G34 which corresponds to the G color component (Step 804). Accordingly, the predetermined color component value G34 of the target pixel P34 is processed by the Gb balance adjustment to generate the target color component value G34' and the target color component value G34' will be further stored as shown in FIG. 10. FIG. 10 depicts a flow chart of a green color value adjustment method 1000 (namely Step 806) according to one exemplary embodiment of the present invention. Provided the result is substantially the same, the steps set forth here are not limited to be executed according to the exact order shown in FIG. 10. Also, the steps need not be in the exact order shown in FIG. 10 and need not be contiguous; that is, other steps can be intermediate. The green color value adjustment method 1000 comprises:

Step 1002: Determine a plurality of difference amounts D0, D1, D2 and D3 respectively between the predetermined color component value G34 of the target pixel P34 and a plurality of the predetermined color component values G23, G25, G43 and G45 of the plurality of adjacent pixels P23, P25, P43 and P45 adjacent to the predetermined color component value G34;

Step 1004: Compute a weighting value Wt according to the plurality of difference amounts D0, D1, D2 and D3;

Step 1006: Determine the target color component value G34' according to the weighting value Wt and the plurality of predetermined color component values G23, G25, G43 and G45 of the plurality of adjacent pixels P23, P25, P43 and P45;

In Step 1002, the plurality of difference amounts D0, D1, D2 and D3 are calculated respectively according to the following equations (1), (2), (3) and (4):

$$D0 = Abs(G23 - G34), \quad (1);$$

$$D1 = Abs(G25 - G34), \quad (2);$$

$$D2 = Abs(G43 - G34), \quad (3);$$

$$D3 = Abs(G45 - G34), \quad (4);$$

wherein Abs( ) represent the operator for the absolute value calculation. When the plurality of difference amounts D0, D1, D2 and D3 are determined, a determination value Mx is determined by selecting a maximum value of the plurality of difference amounts D0, D1, D2 and D3, which is represented as equation (5):

$$Mx = Max(D0, D1, D2, D3)/4 \quad (5);$$

wherein equation (5) finds out the maximum value between the plurality of difference amounts D0, D1, D2 and D3, and the maximum value will be divided by a specific value to generate the determination value Mx. Please note that, in this embodiment, the specific value is 4, which is an illustrative implementation rather than a limitation of the present invention. Accordingly, the determination value Mx is compared with a first threshold value Th and a second threshold value Tl in Step 1004 so as to generate a comparison result, and the comparison result is utilized for determining the weighting value Wt. When the comparison result indicates that the determination value Mx is not smaller than the first threshold value Th, the weighting value Wt is configured as a first value. When the comparison result indicates that the determination value Mx is not larger than the second threshold value Tl, the weighting value Wt is configured as a second value, wherein the first value and the second value are both predetermined values, and the second value is larger than the first value. Please note that the first value is 0 and the second value is 128 in this embodiment. Furthermore, when the comparison result indicates the determination value is between the first threshold value Th and the second threshold value Tl, a weighting value is configured by interpolating a third value according to the first value and the second value. In other words, in this embodiment, when the comparison result indicates that the determination value Mx is between the first threshold value Th and the second threshold value Tl, the weighting value will be between 0 and 128. In addition, the process of calculating the weighting value can be expressed as the following equations of:

If $(Mx \geq Th)$, Wt=0;

else if$(Mx \leq Tl)$, Wt=128;

else Wt=$((Th-Mx)*Tr)/128$;

wherein Tr is a ratio value.

Accordingly, in Step 1006, an average color component value V1 is calculated according to the plurality of predetermined color component values G23, G25, G43 and G45 of the plurality of adjacent pixels P23, P25, P43 and P45, which is expressed as equation (6):

$$V1 = (G23 + G25 + G43 + G45)/4, \quad (6);$$

and the target color component value G34' is determined by the weighting value Wt and the average color component value V1. When the weighting value Wt is not smaller than the first value (namely 128), the average color component value V1 is configured as target component value G34'. When the weighting value Wt is smaller than the first value (128), the target color component value G34' is determined according to the weighting value, the predetermined color component value G34 of the target pixel P34 and the average color component value V1. More specifically, in this embodiment, the predetermined color component value G34 of the target pixel P34 is subtracted from the average color component value V1 to generate a variation. Accordingly, the variation is multiplied by the weighting value Wt to generate a first product and the predetermined color component value G34 of the target pixel P34 is multiplied by the first value (128) to generate a second product. A summation of the first product and the second product is calculated and then the summation is divided by the first value (128) to generate a fourth value V2. Accordingly, the target color component value G34' is determined according to the fourth value V2. When the fourth value V2 is smaller than a third threshold value, the target color component value G34' is configured as the third threshold value. When the fourth value V2 is greater than a fourth threshold value, the target color component value G34' is configured as the fourth threshold value, wherein the fourth threshold value is greater than the third threshold value. When the fourth value V2 is between the third threshold value and the fourth threshold value, the target color component value G34' is configured as the fourth value V2.

Please note that, even though the third threshold value is 0 and the fourth threshold value is 1023 in this embodiment, this is for illustrative purposes only and is not a limitation of the present invention, however. Furthermore, the foregoing process of computing the target color component value G34' can be expressed as the following equations:

If (Wt≥128), $G34'=V1$;

otherwise, $V2=(Wt*(V1-G34)+(G34*128))/128$, and $G34'=TRIM(V2,0,1023)$;

wherein TRIM( ) is the simplified expression of generating the target color component value G34' according to the fourth value V2 as mentioned above.

When the target color component value G34' of the target pixel P34 is calculated, the pixel processing method 800 executes Step 808, which calculates other color component values of the target pixel P34 to derive R, G and B color component values of the target pixel P34. Since those skilled in the art should easily be able to determine the R, G and B color component values of the target pixel P34 by any conventional method after reading Steps 802-808 of the pixel processing method 800, further descriptions are omitted here.

In conclusion, the pixel processing method of the present invention simultaneously performs the first color component process and the second color component process respectively upon the first target pixel and the second first target pixel within the pixel block 104, and the first plurality of pixels partially overlaps the second plurality of pixels. Thus, when an ISP attempts to determine the R, G and B color component values of each pixel within the pixel block 104, only four line buffers are needed as illustrated in FIG. 3 and FIGS. 5-7. In other words, if the first plurality of pixels occupies N line buffers of the buffering device 102, and the second plurality of pixels occupies M line buffers, the present invention only needs line buffers fewer than M+N line buffers to compute the R, G and B color component values of each pixel. Thus, compared with the conventional technology that utilizes six line buffers, the pixel processing method 200 of the present invention can effectively decrease the hardware costs of the ISP.

Those skilled in the art will readily observe that numerous modifications and alterations of the device and method may be made while retaining the teachings of the invention.

What is claimed is:

1. A pixel processing method, comprising:
    selecting a first plurality of color component values of a first plurality of pixels within a pixel block of a buffering device, and performing a first color component process upon a first target pixel in the first plurality of pixels to determine a first target color component value of the first target pixel, and storing the first target color component value;
        while the first color component process is being performed, simultaneously selecting a second plurality of color component values of a second plurality of pixels within the pixel block and performing a second color component process upon a second target pixel in the second plurality of pixels according to the second plurality of color component values to determine at least one underdetermined target color component value of the second target pixel, wherein the second target pixel has been processed by the first color component process; and
        loading a specific pixel within the pixel block of the buffering device;
    wherein the first color component process is determined according to a pixel feature of the specific pixel, and the first color component process comprises one of the following steps:
        (a) balancing the first target color component value of the first target pixel according to a second portion of color component values of the first plurality of color component values; and
        (b) configuring a predetermined color component value of the first target pixel as the first target color component value;
        (c) interpolating the first target color component value of the first target pixel according to a first portion of color component values of the first plurality of color component values;
    wherein when the specific pixel corresponds to a red (R) color component or a blue (B) color component, the first color component process is step (c); when the specific pixel corresponds to a green (G) color component and an adjacent pixel of the specific pixel, adjacent in the same row, corresponds to the B color component, the first color component process is step (a); and when the specific pixel corresponds to the G color component and the adjacent pixel of the specific pixel corresponds to the R color component, the first color component process is step (b).

2. The pixel processing method of claim 1, wherein the first target color component value corresponds to a G color component value.

3. The pixel processing method of claim 1, wherein the pixel block is situated within a color filter array.

4. The pixel processing method of claim 1, wherein the first plurality of pixels partially overlap the second plurality of pixels.

5. The pixel processing method of claim 1, wherein when a predetermined color component value of the second target pixel corresponds to a Green (G) color component, the second color component process computes for an Red (R) color component value and a Blue (B) color component value of the second target pixel as the underdetermined target color component value; when the predetermined color component value of the second target pixel corresponds to the R color component, the second color component process computes for a B color component value of the second target pixel as the underdetermined target color component value; and when the predetermined color component value of the second target pixel corresponds to the B color component, the second color component process computes for an R color component value of the second target pixel as the underdetermined target color component value.

6. The pixel processing method of claim 1, wherein the first plurality of pixels occupy N line buffers of the buffering devices, the second plurality of pixels occupy M line buffers of the buffering device, and the line buffers included in the buffering device are fewer than M+N.

7. A pixel processing apparatus, comprising:
    a buffering device, for temporarily storing a first plurality of color component values of a first plurality of pixels within a pixel block, and a second plurality of color component values of a second plurality of pixels within the pixel block;
    a first processing device, for selecting the first plurality of color component values of the first plurality of pixels within the pixel block and performing a first color component process upon a first target pixel in the first plurality of pixels to determine a first target color component value of the first target pixel, wherein the first processing device comprises:
    a first computation unit, for balancing the first target color component value of the first target pixel according to a second portion of color component values of the first plurality of color component values;
    a second computation unit, for configuring a predetermined color component value of the first target pixel as the first target color component value; and
    a third computation unit, for interpolating the first target color component value of the first target pixel according to a first portion of color component values of the first plurality of color component values;
  a second processing device, for simultaneously selecting the second plurality of color component values of the second plurality of pixels within the pixel block while the first color component process is being performed, and performing a second color component process upon a second target pixel in the second plurality of pixels according to the second plurality of color component values to determine at least one underdetermined target color component value of the second target pixel, wherein the second target pixel has been processed by the first color component process; and
  a third processing device, for loading a specific pixel within the pixel block of the buffering device, and for enabling one of the first computation unit, the second computation unit and the third computation unit according to a pixel feature of the specific pixel;
wherein when the specific pixel corresponds to a red (R) color component or a blue (B) color component, the third processing device enables the third computation unit; when the specific pixel corresponds to a green (G) color component and an adjacent pixel of the specific pixel, adjacent in the same row, corresponds to the B color component, the third processing device enables the first computation unit; and when the specific pixel corresponds to the G color component and the adjacent pixel of the specific pixel corresponds to the R color component, the second processing device enables the third computation unit.

8. The pixel processing apparatus of claim 7, wherein the first target color component value corresponds to a G color component value.

9. The pixel processing apparatus of claim 7, wherein the pixel block is situated within a color filter array.

10. The pixel processing apparatus of claim 7, the first plurality of pixels partially overlaps the second plurality of pixels.

11. The pixel processing apparatus of claim 7, wherein the first plurality of pixels occupies N line buffers of the buffering devices, the second plurality of pixels occupies M line buffers of the buffering device, and the line buffers included in the buffering device are fewer than M+N.

12. A pixel processing method, comprising:
  selecting a first plurality of color component values of a first plurality of pixels within a pixel block of a buffering device, and performing a first color component process upon a first target pixel in the first plurality of pixels to determine a first target color component value of the first target pixel, and storing the first target color component value;
    while the first color component process is being performed, simultaneously selecting a second plurality of color component values of a second plurality of pixels within the pixel block and performing a second color component process upon a second target pixel in the second plurality of pixels according to the second plurality of color component values to determine at least one underdetermined target color component value of the second target pixel, wherein the second target pixel has been processed by the first color component process; and
  loading a specific pixel within the pixel block of the buffering device;
  wherein the first color component process is determined according to a pixel feature of the specific pixel, and the first color component process comprises one of the following steps:
    (a) balancing the first target color component value of the first target pixel according to a second portion of color component values of the first plurality of color component values; and
    (b) configuring a predetermined color component value of the first target pixel as the first target color component value;
    (c) interpolating the first target color component value of the first target pixel according to a first portion of color component values of the first plurality of color component values;
  wherein when the specific pixel corresponds to a red (R) color component or a blue (B) color component, the first color component process is step (c); when the specific pixel corresponds to a green (G) color component and an adjacent pixel of the specific pixel, adjacent in the same row, corresponds to the R color component, the first color component process is step (a); and when the specific pixel corresponds to the G color component and the adjacent pixel of the specific pixel corresponds to the B color component, the first color component process is step (b).

13. The pixel processing method of claim 12, wherein the first target color component value corresponds to a G color component value.

14. A pixel processing method, comprising:
  selecting a first plurality of color component values of a first plurality of pixels within a pixel block of a buffering device, and performing a first color component process upon a first target pixel in the first plurality of pixels to determine a first target color component value of the first target pixel, and storing the first target color component value;
    while the first color component process is being performed, simultaneously selecting a second plurality of color component values of a second plurality of pixels within the pixel block and performing a second color component process upon a second target pixel in the second plurality of pixels according to the second plurality of color component values to determine at least one underdetermined target color component value of the second target pixel, wherein the second target pixel has been processed by the first color component process; and
  loading a specific pixel within the pixel block of the buffering device;
  wherein the first color component process is determined according to a pixel feature of the specific pixel, and the first color component process comprises one of the following steps:
    (a) balancing the first target color component value of the first target pixel according to a second portion of color component values of the first plurality of color component values; and (b) configuring a predetermined color component value of the first target pixel as the first target color component value;

(c) interpolating the first target color component value of the first target pixel according to a first portion of color component values of the first plurality of color component values;

wherein if a coordinate of the specific pixel is (X, Y), a coordinate of the first target pixel is (X−2, Y+2) and a coordinate of the second target pixel is (X−4, Y+3).

15. A pixel processing apparatus, comprising:

a buffering device, for temporarily storing a first plurality of color component values of a first plurality of pixels within a pixel block, and a second plurality of color component values of a second plurality of pixels within the pixel block;

a first processing device, for selecting the first plurality of color component values of the first plurality of pixels within the pixel block and performing a first color component process upon a first target pixel in the first plurality of pixels to determine a first target color component value of the first target pixel, wherein the first processing device comprises:

a first computation unit, for balancing the first target color component value of the first target pixel according to a second portion of color component values of the first plurality of color component values;

a second computation unit, for configuring a predetermined color component value of the first target pixel as the first target color component value; and a third computation unit, for interpolating the first target color component value of the first target pixel according to a first portion of color component values of the first plurality of color component values;

a second processing device, for simultaneously selecting the second plurality of color component values of the second plurality of pixels within the pixel block while the first color component process is being performed, and performing a second color component process upon a second target pixel in the second plurality of pixels according to the second plurality of color component values to determine at least one underdetermined target color component value of the second target pixel, wherein the second target pixel has been processed by the first color component process; and a third processing device, for loading a specific pixel within the pixel block of the buffering device, and for enabling one of the first computation unit, the second computation unit and the third computation unit according to a pixel feature of the specific pixel;

wherein when the specific pixel corresponds to a red (R) color component or a blue (B) color component, the third processing device enables the third computation unit; when the specific pixel corresponds to a green (G) color component and an adjacent pixel of the specific, adjacent in the same row, corresponds to the R color component, the third processing device enables the first computation unit; and when the specific pixel corresponds to the G color component and the adjacent pixel of the specific pixel corresponds to the B color component, the second processing device enables the third computation unit.

16. The pixel processing apparatus of claim 15, wherein the first target color component value corresponds to a G color component value.

17. A pixel processing apparatus, comprising:

a buffering device, for temporarily storing a first plurality of color component values of a first plurality of pixels within a pixel block, and a second plurality of color component values of a second plurality of pixels within the pixel block;

a first processing device, for selecting the first plurality of color component values of the first plurality of pixels within the pixel block and performing a first color component process upon a first target pixel in the first plurality of pixels to determine a first target color component value of the first target pixel, wherein the first processing device comprises:

a first computation unit, for balancing the first target color component value of the first target pixel according to a second portion of color component values of the first plurality of color component values;

a second computation unit, for configuring a predetermined color component value of the first target pixel as the first target color component value; and a third computation unit, for interpolating the first target color component value of the first target pixel according to a first portion of color component values of the first plurality of color component values; and a second processing device, for simultaneously selecting the second plurality of color component values of the second plurality of pixels within the pixel block while the first color component process is being performed, and performing a second color component process upon a second target pixel in the second plurality of pixels according to the second plurality of color component values to determine at least one underdetermined target color component value of the second target pixel, wherein the second target pixel has been processed by the first color component process, wherein the second processing device comprises:

a fourth computation unit, for computing an Red (R) color component value and a Blue (B) color component value of the second target pixel as the underdetermined target color component value when a predetermined color component value of the second target pixel corresponds to a Green (G) color component;

a fifth computation unit, for computing the B color component value of the second target pixel as the underdetermined target color component value when the predetermined color component value of the second target pixel corresponds to the R color component; and a sixth computation unit, for computing an R color component value of the second target pixel as the underdetermined target color component value when the predetermined color component value of the second target pixel corresponds to the B color component.

18. A pixel processing apparatus, comprising:

a buffering device, for temporarily storing a first plurality of color component values of a first plurality of pixels within a pixel block, and a second plurality of color component values of a second plurality of pixels within the pixel block;

a first processing device, for selecting the first plurality of color component values of the first plurality of pixels within the pixel block and performing a first color component process upon a first target pixel in the first plurality of pixels to determine a first target color compo nent value of the first target pixel, wherein the first processing device comprises:
  a first computation unit, for balancing the first target color component value of the first target pixel according to a second portion of color component values of the first plurality of color component values;
  a second computation unit, for configuring a predetermined color component value of the first target pixel as the first target color component value; and
  a third computation unit, for interpolating the first target color component value of the first target pixel according to a first portion of color component values of the first plurality of color component values;
a second processing device, for simultaneously selecting the second plurality of color component values of the second plurality of pixels within the pixel block while the first color component process is being performed, and performing a second color component process upon a second target pixel in the second plurality of pixels according to the second plurality of color component values to determine at least one underdetermined target color component value of the second target pixel, wherein the second target pixel has been processed by the first color component process; and
a third processing device, for loading a specific pixel within the pixel block of the buffering device, and for enabling one of the first computation unit, the second computation unit and the third computation unit according to a pixel feature of the specific pixel;
wherein if a coordinate of the specific pixel is (X, Y), a coordinate of first target pixel is (X−2, Y+2) and a coordinate of the second target pixel is (X−4, Y+3).

* * * * *